(12) United States Patent
Rozman et al.

(10) Patent No.: US 7,786,708 B2
(45) Date of Patent: Aug. 31, 2010

(54) STARTER/GENERATOR SYSTEM WITH CONTROL TO ADDRESS A VOLTAGE RISE

(75) Inventors: Gregory I. Rozman, Rockford, IL (US); Vijay K. Maddali, Rockford, IL (US); Kevin Dooley, Mississauga (CA)

(73) Assignees: Pratt & Whitney Canada Corp., Quebec (CA); Hamilton Sunstrand Corporation, Rockford, IL (US)

( * ) Notice: Subject to any disclaimer, the term of this patent is extended or adjusted under 35 U.S.C. 154(b) by 487 days.

(21) Appl. No.: 11/867,907

(22) Filed: Oct. 5, 2007

(65) Prior Publication Data

US 2009/0091132 A1  Apr. 9, 2009

(51) Int. Cl.
F02N 11/04 (2006.01)
H02P 9/04 (2006.01)

(52) U.S. Cl. .............................. 322/24; 322/10; 290/31

(58) Field of Classification Search .................. 322/10, 322/23, 24, 25, 37, 46, 99; 290/31, 36 R
See application file for complete search history.

(56) References Cited

U.S. PATENT DOCUMENTS

| 4,841,216 | A | * | 6/1989 | Okada et al. ................... 322/10 |
| 4,947,100 | A | * | 8/1990 | Dhyanchand et al. ......... 322/10 |
| 5,008,801 | A | | 4/1991 | Glennon |
| 5,013,929 | A | * | 5/1991 | Dhyanchand ................ 290/31 |
| 5,281,905 | A | | 1/1994 | Dhyanchand |
| 5,317,498 | A | | 5/1994 | Dhyandchand |
| 5,332,927 | A | * | 7/1994 | Paul et al. ..................... 307/66 |
| 5,521,787 | A | | 5/1996 | Baker |
| 5,594,322 | A | * | 1/1997 | Rozman et al. ............... 322/10 |
| 5,627,744 | A | | 5/1997 | Baker |
| 5,764,502 | A | | 6/1998 | Morgan |
| 5,977,645 | A | | 11/1999 | Glennon |
| 6,084,786 | A | * | 7/2000 | Rozman ....................... 363/48 |
| 6,134,127 | A | | 10/2000 | Kirchberg |
| 6,850,426 | B2 | | 2/2005 | Kojori |
| 7,400,117 | B1 | * | 7/2008 | Rozman et al. ............... 322/45 |
| 7,501,799 | B2 | * | 3/2009 | Rozman et al. ............... 322/46 |
| 7,508,086 | B2 | * | 3/2009 | Huang et al. .................. 290/31 |
| 7,619,327 | B2 | * | 11/2009 | Rozman et al. ............. 307/153 |

* cited by examiner

*Primary Examiner*—Nicholas Ponomarenko
(74) *Attorney, Agent, or Firm*—Carlson, Gaskey & Olds

(57) ABSTRACT

A control circuit for a generator has a control function that monitors the voltage across a bus capacitor. The circuit delivers excess voltage back to associated stator windings if an unduly high voltage is detected across the bus capacitor.

11 Claims, 1 Drawing Sheet

STARTER/GENERATOR SYSTEM WITH CONTROL TO ADDRESS A VOLTAGE RISE

BACKGROUND OF THE INVENTION

This application relates to an electrical control circuit for a brushless synchronous machine, wherein an inverter circuit is used to start the engine as well as to allow excess voltage from a capacitor to flow back toward the brushless synchronous machine if there is an undue rise in the voltage across the capacitor.

Generators are known and are utilized to generate electricity for an associated system. The use of a generator in starting and generating modes in aircraft application has been realized in a variable-speed, constant frequency (VSCF) power generating systems. In such a system the variable-frequency power is rectified and provided a DC link (bus) to a controllable static inverter. The DC bus provides power to other loads connected to the bus. A bus capacitor is mounted in parallel with these loads.

Under certain conditions, if the load on the bus is reduced, the voltage across the bus capacitor will rise. In the past, the bus capacitor has needed to be sufficiently large to handle this voltage rise.

In addition, other elements such as a transient suppressor, which may be a shunt regulator, have been connected across the bus via a power switch to provide a temporary load to compensate for the lower load condition from the bus during such instances.

The result is that a large capacitor and large transient suppressor have been required.

In the system shown in U.S. Pat. No. 6,838,860. The control is not utilized to respond to an undue transient voltage across a bus capacitor.

SUMMARY OF THE INVENTION

In a disclosed embodiment of this invention, a starter inverter is provided to allow flow of power from a battery back to a generator during a start mode. This starter inverter is enabled and reverses the power flow from the generator to the load when an undue voltage is seen on a bus.

These and other features of the present invention can be best understood from the following specification and drawings, the following of which is a brief description.

DETAILED DESCRIPTION OF THE PREFERRED EMBODIMENT

Figure 1:
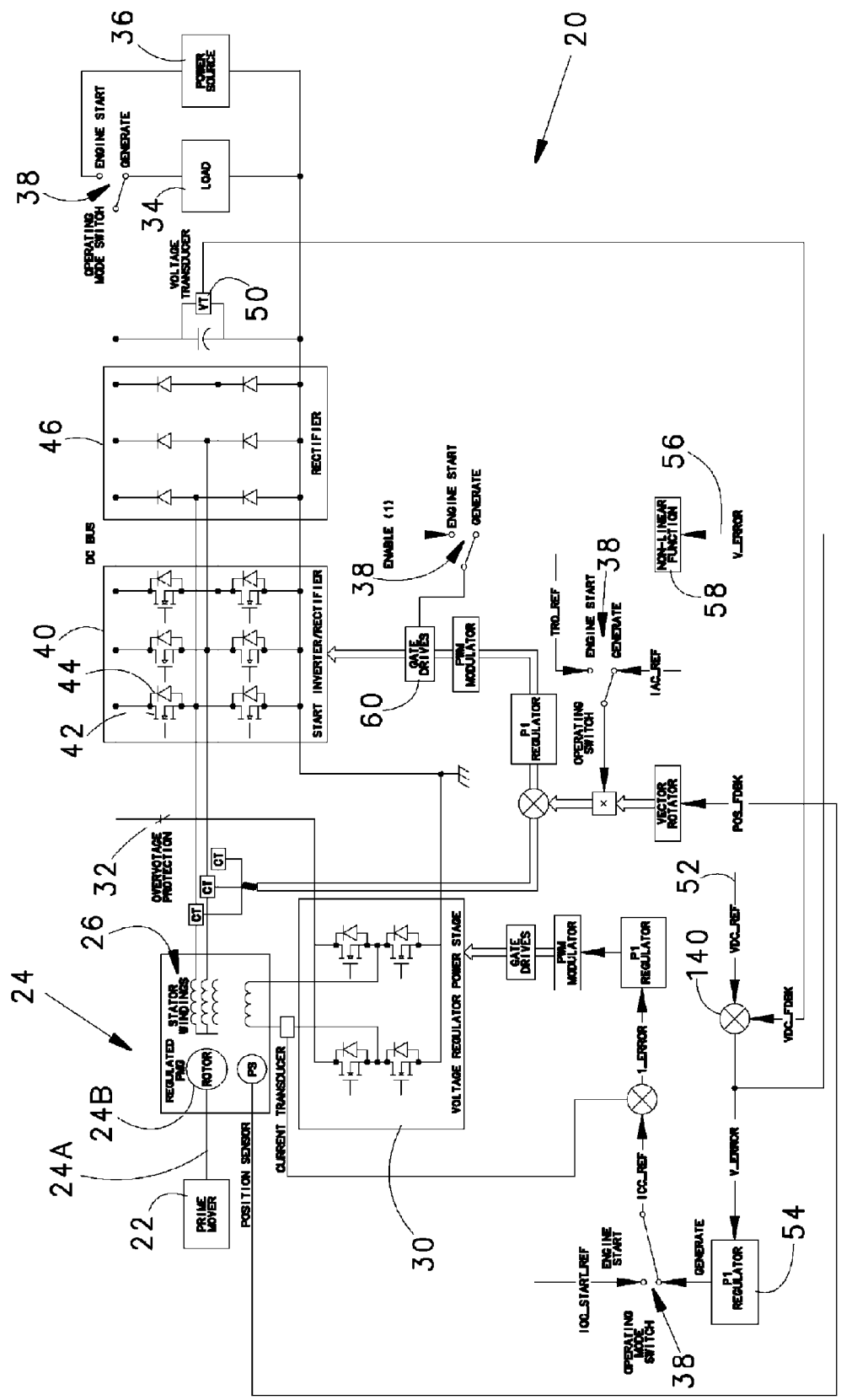
FIG. 1 is a schematic view of an electric circuit for providing the present invention.

A starter/generator system 20 is illustrated in FIG. 1. A prime mover 22 drives a rotor. The prime mover may be a gas turbine engine for an aircraft, driving a motive power shaft 24A interconnecting a rotor 24B of the generator 24 and prime mover 22. The generator may be a wound field synchronous or a regulated permanent magnet machine, as illustrated in FIG. 1. The regulated permanent magnet generator also includes stator windings 26 and a control coil 28 are associated with the shaft 24.

The generator 28 may be a permanent magnet generator, and may be an integrated starter-generator. The application does extend to other types of generators. One such system, as is generally described in this application, is disclosed in United States Published Patent Applications 2004/039202A1, 2006/0226721A1, and 2006/0113967A1. The present invention is directed to improving upon these basic systems, or other systems, as will be described below.

A voltage regulator 30 is associated with the circuit 20. An over-voltage protection switch 32 is also associated with the control coil 28.

A load 34, connected to a DC bus, is provided with electricity from the stator windings 26 and a rectifier 46 in a generate mode. A power source 36, such as a battery, is connected back to the windings 26 through an operating mode switch 38, DC link and inverter 40. Inverter 40 produces variable voltage, variable frequency power during start mode.

A start inverter circuit 40 includes switches 42, and diodes 44. During start mode inverter switches 42 are controlled by a pulse-width modulator to enable variable voltage variable frequency power to start the engine. At this time, switch 38 is positioned at the start position.

Once the engine is started, as when the prime mover 22 is a gas turbine engine, the switches 42 are disabled (opened), and inverter operates as a six-pulse rectifier enabling power flows from the windings 26 to the load 34. At this time, switch 38 is at the illustrated generate position. Switch 38 also changes three other signals within the circuit 20.

A voltage reference 52 is sent to a comparator 140 along with a voltage across a bus capacitor 48 from a voltage transducer 50. An error signal is sent on line 56 to a PI regulator 54, which provides feedback to a regulator for the control coil.

In a generate mode, power flows from the windings 26 to the load 34. The switches 42 are opened. Under some conditions, the required power at the load 34 may drop. If this occurs, the voltage across the bus capacitor 48 can become unduly high, or spike. In the past, various safety devices have been required to address this potential.

In the present application, a signal on line 56 from the comparator 140 is sent to a non-linear function box 58. Any other type of circuitry can be utilized as the control in place of the non-linear function box 58. Essentially, the non-linear function box asks if the error signal on line 56 is less than a minimum error. If the error signal is less than the minimum error, this would indicate that the voltage across the bus capacitor 48 is unduly large. Any other way of detecting the unduly large voltage may be utilized. If the non-linear function box detects a voltage across the capacitor 48 that is unduly large, a signal is sent to a gate drive 60 for the switches 42. The gate drive 60 is generally as known in the art, and has been utilized in connection with a start mode to control the switches 42. However, the gate drive 60 has not been provided with the additional control such as provided when an unduly high voltage is detected. Thus, when an unduly high voltage is detected across bus capacitor 48, the gate drive 60 is enabled and inverter 40 is controlled to drain the excess voltage from the bus capacitor 48 back to the windings 26.

Once the situation has been corrected, the non-linear function box 58 will detect the drop in voltage, and again disable the switches 42.

This application, by allowing existing circuitry to be utilized to deal with a potentially high voltage across the capacitor 48, allows the use of a smaller capacitor for the bus capacitor. Moreover, while a transient suppressor may still be necessary for a no-load situation, it can be provided by much smaller components, as the components need not address high voltage load situation as explained above.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A starter/generating system comprising:

a plurality of stator windings connected to a start inverter, a bus capacitor mounted in parallel with a load, and a power source for being selectively connected to said stator windings through a start/generate switch, said start/generate switch moving to a generate position to connect said stator windings to said load;

a control for controlling said start inverter to allow the flow of power from said power source to said stator windings in one position, and to allow the flow of power from said stator windings to said load in a second position; and a control to detect an unduly high voltage on said bus capacitor, said control being operable to allow flow of power from said bus capacitor back to said stator windings if an unduly high voltage is detected.

2. The starter/generating system as set forth in claim 1, wherein a voltage transducer is associated with said bus capacitor to provide a detected voltage signal to a comparator, said comparator also receiving a reference voltage signal, and said control being provided with a difference between said detected voltage signal and said reference voltage signal.

3. The starter/generating system as set forth in claim 1, wherein said control communicates with a gate drive for closing a second set of switches in said start inverter.

4. The starter/generating system as set forth in claim 3, wherein said start inverter includes a plurality of parallel paths including a diode on one path to allow flow from said stator windings to said load, and one of said second set of switches on a parallel path to allow flow of power from an upstream location back to said stator windings.

5. The starter/generating system as set forth in claim 2, wherein the generator is a permanent magnet generator.

6. A gas turbine engine comprising:

a shaft being driven to rotate;

a plurality of stator windings connected to a start inverter, a bus capacitor mounted in parallel with a load, and a power source for being selectively connected to said stator windings through a start/generate switch, said start/generate switch moving to a generate position to connect said stator windings to said load;

a control for controlling said start inverter to allow the flow of power from said power source to said stator windings in one position, and to allow the flow of power from said stator windings to said load in a second position; and a control to detect an unduly high voltage on said bus capacitor, said control being operable to allow flow of power from said bus capacitor back to said stator windings if an unduly high voltage is detected.

7. The gas turbine engine as set forth in claim 6, wherein a voltage transducer is associated with said bus capacitor to provide a detected voltage signal to a comparator, said comparator also receiving a reference voltage signal, and said control being provided with a difference between said detected voltage signal and said reference voltage signal.

8. The gas turbine engine as set forth in claim 6, wherein said control communicates with a gate drive for closing a second set of switches in said start inverter.

9. The gas turbine engine as set forth in claim 8, wherein said start inverter includes a plurality of parallel paths including a diode on one path to allow flow from said stator windings to said load, and one of said second set of switches on a parallel path to allow flow of power from an upstream location back to said stator windings.

10. The gas turbine engine as set forth in claim 6, wherein a generator is a permanent magnet generator.

11. A method of controlling a generator comprising the steps of:

providing a plurality of stator windings connected to a start inverter, and a bus capacitor mounted in parallel with a load, and a power source connected to said stator windings through a start/generate switch, said start/generate switch moving to a generate position to connect said stator windings to said load;

controlling said start inverter to allow the flow of power from said power source to said windings in a start position, and to allow the flow of power from said stator windings to said load in a generate position; and detecting an unduly high voltage on said bus capacitor, and then controlling the start inverter to allow flow of power from said bus capacitor back to said stator windings.

* * * * *